United States Patent
Candelore et al.

(10) Patent No.: US 9,392,318 B2
(45) Date of Patent: Jul. 12, 2016

(54) RECEIVER DEVICE WITH MULTIPLE DECRYPTION MODES

(75) Inventors: Brant L. Candelore, San Diego, CA (US); Steven Richman, San Diego, CA (US)

(73) Assignee: Sony Corporation, Tokyo (JP)

(*) Notice: Subject to any disclaimer, the term of this patent is extended or adjusted under 35 U.S.C. 154(b) by 1074 days.

(21) Appl. No.: 13/159,582

(22) Filed: Jun. 14, 2011

(65) Prior Publication Data

US 2012/0321080 A1 Dec. 20, 2012

(51) Int. Cl.
*H04N 7/167* (2011.01)
*H04N 7/16* (2011.01)
(Continued)

(52) U.S. Cl.
CPC ........... *H04N 21/4181* (2013.01); *G06F 21/10* (2013.01); *H04N 21/42623* (2013.01); *H04N 21/4405* (2013.01); *H04N 7/16* (2013.01); *H04N 7/167* (2013.01)

(58) Field of Classification Search
CPC ......... G06F 21/72; G06F 15/16; G06F 21/10; G06F 9/4443; H04N 7/163; H04N 7/1675; H04N 21/2541; H04N 21/4334; H04N 21/43853; H04N 21/4408; H04N 21/4627; H04N 21/835; H04N 21/8355; H04N 21/4367; H04N 7/17318; H04N 21/2347; H04N 21/4147; H04N 21/6405; H04L 63/10; H04L 29/06027; H04L 65/4084; H04L 2463/101; H04L 63/0853; H04L 2209/80; H04L 9/3234; H04W 12/04; G06Q 20/3229; G06Q 20/3255
USPC ...................... 713/155; 380/277, 201; 725/90
See application file for complete search history.

(56) References Cited

U.S. PATENT DOCUMENTS 6,714,650 B1   3/2004   Maillard et al.
7,239,704 B1 *  7/2007   Maillard et al. ............. 380/210
(Continued)

FOREIGN PATENT DOCUMENTS

EP   0562295 A1   9/1993
EP   1781032 A2   5/2007
(Continued)

OTHER PUBLICATIONS

Anonymous, "Working Document: Aspects of IPTV End System—Terminal Device," International Telecommunication Union, Jul. 23-31, 2007.
(Continued)

*Primary Examiner* — Arvin Eskandarnia
*Assistant Examiner* — Margishi Desai
(74) *Attorney, Agent, or Firm* — John L. Rogitz

(57) ABSTRACT

A digital television receiver device supporting two or more different conditional access systems has a content receiver that obtains an encrypted content stream and a processor. A content stream decrypter decrypts an encrypted content stream for conditional access or copy protection from at least one of the following interfaces: an interface to a CableCARD, an interface to a Common Interface Module consumer replaceable module for use with conditional access key management and content stream conditional access decryption and content stream copy protection re-encryption, and at least one of the following interfaces: an interface to a USB2 compatible consumer replaceable module, an interface to an enhanced SIM consumer replaceable card. Other variations are disclosed. This abstract is not to be considered limiting, since other embodiments may deviate from the features described in this abstract.

7 Claims, 11 Drawing Sheets

(51) Int. Cl.
*H04N 5/50* (2006.01)
*H04N 21/418* (2011.01)
*H04N 21/4405* (2011.01)
*G06F 21/10* (2013.01)
*H04N 21/426* (2011.01)

(56) References Cited

U.S. PATENT DOCUMENTS

| | | | |
|---|---|---|---|
| 7,302,058 B2 | 11/2007 | Candelore | |
| 7,366,302 B2 | 4/2008 | Candelore | |
| 7,508,942 B2 | 3/2009 | Candelore | |
| 7,565,546 B2 | 7/2009 | Candelore | |
| 7,661,119 B1* | 2/2010 | Arsenault | H04N 7/20 348/461 |
| 7,742,599 B2 | 6/2010 | Candelore | |
| 7,937,595 B1* | 5/2011 | Kumar et al. | 713/192 |
| 2003/0110382 A1* | 6/2003 | Leporini | G06F 21/10 713/172 |
| 2003/0196113 A1 | 10/2003 | Brown et al. | |
| 2003/0200548 A1* | 10/2003 | Baran | H04L 29/06027 725/90 |
| 2004/0228175 A1 | 11/2004 | Candelore et al. | |
| 2004/0237099 A1 | 11/2004 | Shin et al. | |
| 2004/0261114 A1* | 12/2004 | Addington | H04L 41/5051 725/106 |
| 2005/0152545 A1* | 7/2005 | Desmicht et al. | 380/210 |
| 2006/0257102 A1* | 11/2006 | Park et al. | 386/94 |
| 2007/0220279 A1* | 9/2007 | Northcutt et al. | 713/193 |
| 2008/0118061 A1* | 5/2008 | Yang et al. | 380/200 |
| 2008/0148063 A1* | 6/2008 | Hanko et al. | 713/189 |
| 2008/0170698 A1* | 7/2008 | Candelore | 380/277 |
| 2008/0177998 A1 | 7/2008 | Apsangi et al. | |
| 2008/0219443 A1 | 9/2008 | Candelore | |
| 2008/0263621 A1 | 10/2008 | Austerlitz et al. | |
| 2009/0016349 A1 | 1/2009 | Cha | |
| 2009/0044239 A1 | 2/2009 | Cha | |
| 2009/0144776 A1 | 6/2009 | Walter et al. | |
| 2009/0158401 A1* | 6/2009 | Kim et al. | 726/4 |
| 2009/0168996 A1 | 7/2009 | Candelore | |
| 2009/0288151 A1 | 11/2009 | Agahi | |
| 2010/0254536 A1* | 10/2010 | Dellow | 380/278 |
| 2010/0272267 A1* | 10/2010 | Conus et al. | 380/281 |
| 2010/0325415 A1* | 12/2010 | Ohlman et al. | 713/150 |
| 2011/0017825 A1* | 1/2011 | Beals | 235/441 |
| 2011/0107364 A1* | 5/2011 | Lajoie et al. | 725/25 |
| 2011/0197069 A9* | 8/2011 | Rodgers et al. | 713/176 |
| 2011/0258706 A1* | 10/2011 | Rouse et al. | 726/28 |
| 2012/0079270 A1* | 3/2012 | Patel | 713/165 |
| 2012/0179904 A1* | 7/2012 | Dunn et al. | 713/155 |
| 2012/0188104 A1* | 7/2012 | Choi | 340/989 |
| 2012/0304217 A1* | 11/2012 | Kooman | 725/25 |

FOREIGN PATENT DOCUMENTS

| | | |
|---|---|---|
| JP | 2003-515286 A | 4/2003 |
| JP | 2003515286 | 4/2003 |
| JP | 2011-066573 A | 3/2011 |
| JP | 2011066573 | 3/2011 |
| JP | 2011-078043 A | 4/2011 |
| JP | 2011078043 | 4/2011 |

OTHER PUBLICATIONS

Seong Oun Hwang: "Content and Service Protection for IPTV", IEEE Transactions on Broadcasting, IEEE Service Center, Piscataway, NJ, US, vol. 55, No. 2, Jun. 1, 2009, pp. 425-436, ISSN: 0018-9316.

EESR for related EP application 12800470.2-1905/2705662, PCT/US2012030588 dated Feb. 4, 2014 (received by undersigned on Apr. 1, 2015).

Office Action in related Japanese application No. JP 2014-515814.

* cited by examiner

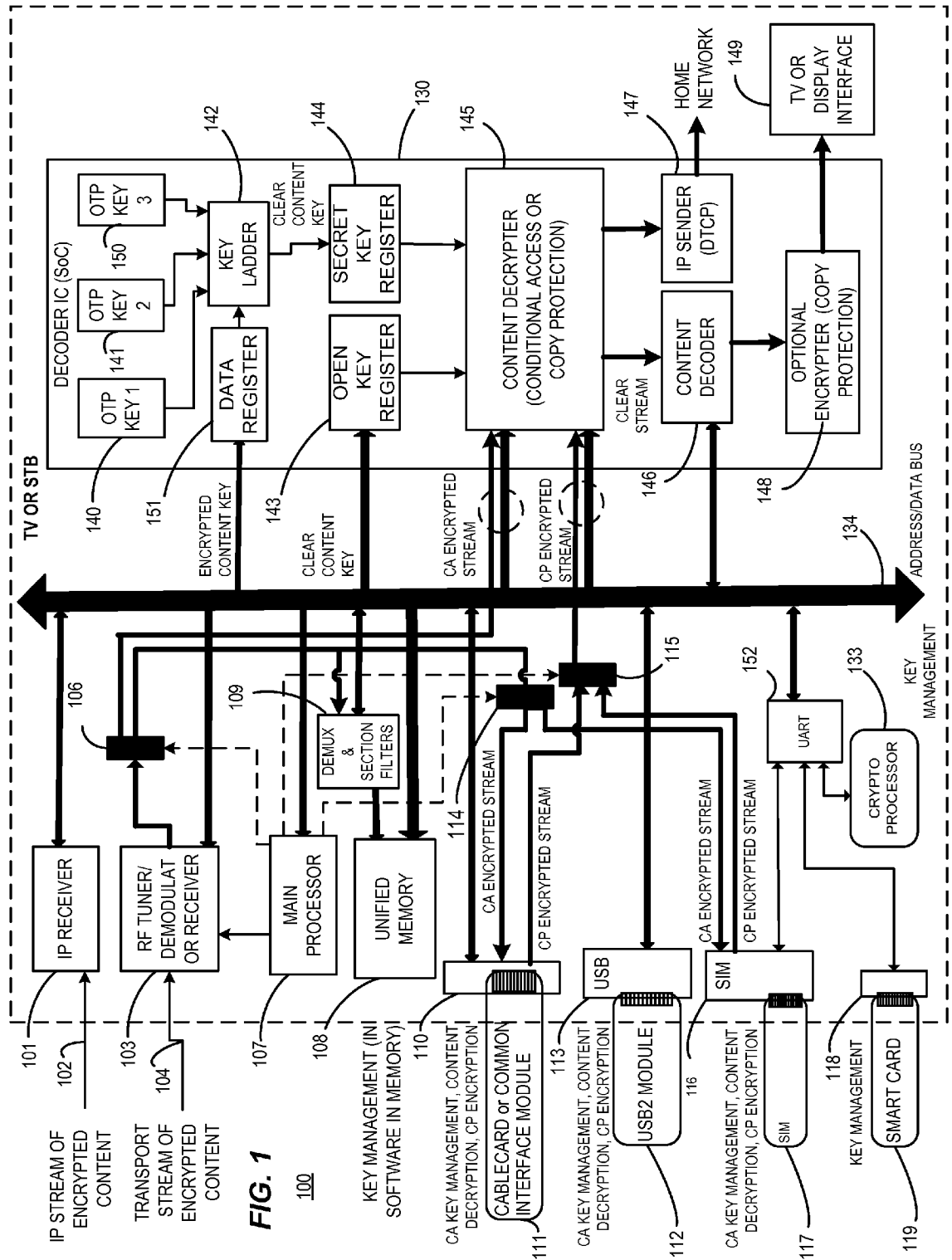

the patent document or the patent disclosure, as it
RECEIVER DEVICE WITH MULTIPLE DECRYPTION MODES

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In the United States, many in the consumer electronics industry are unhappy with CableCARD modules. 68-pin connectorization, power supply needs, heat sinking, multiple stream management and conformance testing add significant reliability problems, complexity, and cost to digital cable TV receivers. As a consequence, companies, looking for alternatives, have proposed alternate form factor modules, smart cards, and software downloadable schemes. To date, these approaches have not gained acceptance due to market forces, regulatory hurdles, and proper configuration as will be discussed.

As of this writing, in the United States, CableCARDs are being required by the FCC for all advanced cable receivers and some waivers are being allowed for embedded conditional access installed in cable operator owned, low-end receivers. Alternative approaches that offer cheaper, more efficient and smaller form factors for conditional access (CA) may be possible while addressing legacy cable systems supporting CableCARD. The key to the success of these alternate approaches, and the subject of the invention disclosed herein, will be the support and provisioning of multiple CA approaches at the same time within a receiver. By allowing the receiver to adapt to the different CA requirements of different service providers, some that support the legacy CableCARDs and others that support alternate approaches to conditional access, consumers will have unimpeded use of their digital TV receivers across content services.

A multiple slot approach used in receivers called "Multicrypt" allows access to independent services without having the home consumer swap smart cards or Common Interface modules if only a single slot were provided. The home consumer installs different modules from the different services into different receiver slots. When accessing a particular channel, the receiver automatically chooses the appropriate module. To our knowledge, Multicrypt has only been used with smart card slots or Common Interface modules slots, and it has not been used with them at the same time or accommodated other variations of CA adapters.

It is helpful to note that there are generally two aspects to conditional access (CA) processing. The first aspect is key management which derives or calculates the CA decryption key needed to descramble content. The other aspect is the stream descrambling itself. Some conditional access solutions rely on proprietary descrambling algorithms to prevent hardware cloning. And so, some solutions, using modules, combine the two aspects, key management and stream descrambling in a user replaceable device, while, other solutions just implement the key management aspect and can be replaced using devices such smart card or downloadable software. In some instances, the security of those approaches is enhanced by tying the key management to a one-time programmable (OTP) key and ladder built into the descrambler hardware of the receiver. These and other distinctions will be made clear in the following description.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 1 is a comprehensive block diagram of an implementation of a television receiver device consistent with many of the embodiments of the present invention.

DETAILED DESCRIPTION

Figure 2A:
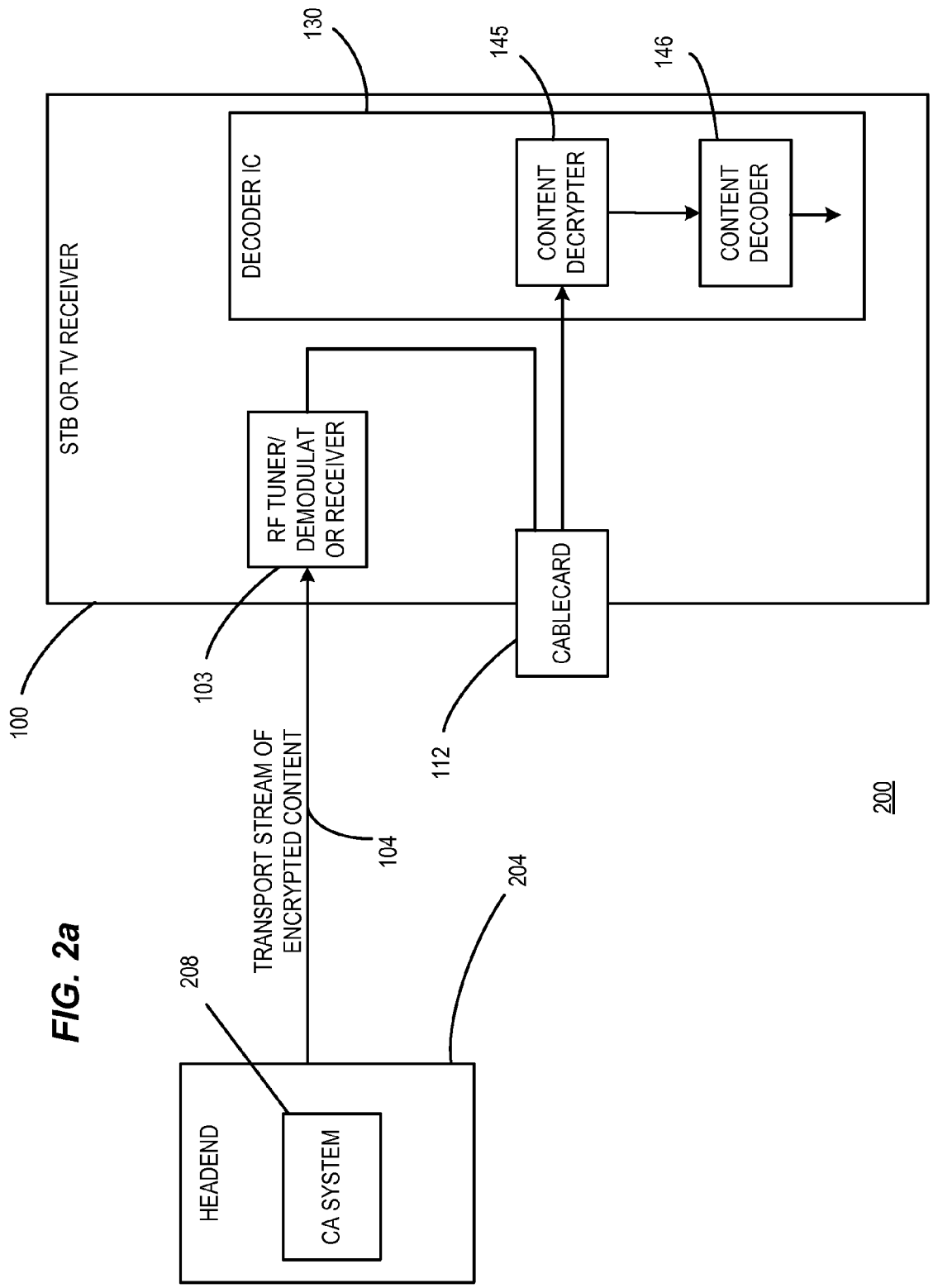
FIGS. 2*a*, 2*b* and 2*c* (collectively "FIG. 2") are example block diagrams of a content delivery system and television receiver device consistent with certain embodiments of the present invention dealing with modules.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two as or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation. A cryptographic processor is a processor with its own dedicated non-volatile memory for storing instructions and data including keys as well as RAM for dynamic data and scratch pad. It is typically hardened against probing and various hardware attacks.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "decrypt" and "descramble" are synonymous. They involve the transformation of key and data information using a key and a decryption (scrambling) algorithm like the Digital Encryption Standard (DES) or the Advanced Encryption Standard (AES).

The terms "DRM" and "CA" are synonymous. DRM which stands for "digital rights management" is a security approach that typically involves software-only implementations. CA which stands for "conditional access" typically involves hardware implementations. However, each can to the same security functionality which is to ensure the payment of subscription or video-on-demand (VOD) fees as well as, in some cases, copy protection and copy management functionality.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As was previously noted, companies have proposed downloadable conditional access systems. A recent example is the Downloadable Conditional Access System (DCAS) promoted by CableLabs as a means for securely downloading conditional access (CA) software for managing key management into a security ASIC embedded in a digital TV receiver. Open Media Security (OMS) is another recent system for downloading CA key management software to the main processor. The software works with a one-time-programmable (OTP) key and a key ladder. While this approach does not require a separate security processor, secret key values are kept secure in the decoder silicon.

Another approach uses a smart card for handling key management. The smart card approach can use an open key register to access the content decrypter. An issue with the smart card approach is that the key calculated or derived needs to be delivered across the user accessible smart card interface. Some techniques include re-encrypting the content key in the smart card and then have it be decrypted by the main processor in the receiver. But a hacker could eavesdrop on the key by monitoring the address and data buses of the receiver. An enhancement re-encrypts the key in the smart card using a pairing key based on a secret OTP key in the decoder silicon. Indeed, the DCAS approach used this method to secure the content key from the security ASIC to the decoder IC where the content was decrypted. This technique is described in U.S. Pat. No. 7,302,058 which is hereby incorporated by reference.

Another approach uses simple software for handling conditional access key management executed by the main processor. Typically software like this relies on software obfuscation to protect key values and monitoring of parameters within the receiver to detect monitoring. Security called "Digital Rights Management" (DRM) is a type of conditional access application that is consistent with embodiments of the invention. Many DRM implementations are software-only. Software-only applications use an open key register when accessing the content decrypter. They can in some cases also include the content decryption algorithm. Software decryption of content can often be facilitated through selective encryption of the content. But selective encryption is not a requirement for decryption of the content by the software application. When the software decrypts the content, a determination is made whether the clear compressed content is to be delivered over a home network or consumed locally. If the content is to be consumed locally, then the clear content is delivered to the content decoder. Although less secure than the hardware approaches discussed herein, software can be downloaded to recover from a security breach. New receivers can be brought online by merely downloading the application. And like the smart card approach, the software approach can still benefit from an OTP key and key ladder to enhance security.

In the United States, it is not clear that certain cable providers will ever be able to support any of the alternative approaches to CableCARD due to market forces. However, the conditional access of those companies can be accommodated as one of the systems supported by the receiver. Indeed, the subject matter of the present invention details a hybrid Multicrypt approach where a TV receiver device can support a number of separate, non-form factor similar conditional access solutions—CableCARD and other solutions. As there are a number of different permutations and possibilities shown in Table 1—some that do not involve CableCARD—it is not intended to be limiting. These approaches are viable even if dominant vendors in the United States do not actively support the alternative security approaches to CableCARD. Moreover, the competing cable operators which utilize differing CA systems do not have to agree on a single alternate approach, since a single type of receiver can support one or more alternate approaches and provide a migration path for movement to the other approach.

There are the following scenarios:

TABLE 1

|   | PCMCIA Module | USB Module | Enhanced SIM Module | Software Only | Smart Card | SIM | Software with OTP1 or OTP2 or OTP3 | Smart Card with OTP1 or OTP2 or OTP3 | SIM with OTP1 or OTP2 or OTP3 |
|---|---|---|---|---|---|---|---|---|---|
| 1 | ✓ | ○ | ○ | ✓ | | | | | |
| 2 | ✓ | ○ | ○ | | ✓ | | | | |
| 3 | ✓ | ○ | ○ | | | ✓ | | | |

TABLE 1-continued

| | PCMCIA Module | USB Module | Enhanced SIM Module | Software Only | Smart Card | SIM | Software with OTP1 or OTP2 or OTP3 | Smart Card with OTP1 or OTP2 or OTP3 | SIM with OTP1 or OTP2 or OTP3 |
|---|---|---|---|---|---|---|---|---|---|
| 4 | ✓ | ○ | ○ | | | | ✓ | | |
| 5 | ✓ | ○ | ○ | | | | | ✓ | |
| 6 | ✓ | ○ | ○ | | | | | | ✓ |
| 7 | | | | ✓ | ○ | ○ | ✓ | | |
| 8 | | | | ✓ | ○ | ○ | | ✓ | |
| 9 | | | | ✓ | ○ | ○ | | | ✓ |
| 10 | | | | ✓ | ✓ | ✓ | | | |
| 11 | ✓ | ✓ | ✓ | | | | | | |
| 12 | | | | | | | ✓ | ✓ | ✓ |

With reference to FIG. 1, an example of a system implementation consistent with embodiments of the present invention is depicted as a television (TV) receiver device 100. In this 100 (which may be a television set or a television set top box for example or any other television receiver device), a content stream is received from a cable, terrestrial, telco, satellite, or web service via IP receiver 101 or the tuner/demodulator 103. The content can be received either as an IP stream of content 102 at 101 or via an RF tuner/demodulator/receiver 103 as a transport stream of encrypted content (e.g., an MPEG (Moving Pictures Expert Group) transport stream).

Any of several types of modules may be utilized in the processes described herein such as a CableCARD module 111 attached to interface 110, a USB (universal serial bus, e.g., USB version 2.0 or USB2) module 112 attached to a USB interface 113, a single inline module (SIM) card 117 connected to interface 116 or a smart card 119 attached to interface 118. It is noted that this implementation 100 includes interfaces to each of the four modules described above, but in other implementations, only subsets of these interfaces may be utilized without limitation.

One or more address/data bus 134 is used to transport data about the system 100 and to and from main processor 107 which also controls various data paths via switches 106, 114 and 115. Certain of the processes may utilize a separate crypto processor 133 that interfaces to the system via UART 152.

A decoder integrated circuit (IC) system on a chip (SoC) 130 incorporates one or more one time programmable (OTP) keys such as 140, 141 and 150 (for example) that are used in various manners as described herein with or without a key ladder 142. Received encrypted content keys are passed from bus 134 to a data register 151 during some processes. Clear content keys may be stored in open key register 143 while secret keys generated by the key ladder are stored in secret key register 144. Upon decryption of the content, the content may be passed either to a content decoder 146 which optionally is encrypted at 148 for consumption by a local display or display interface 149 or an IP sender 147 for home network consumption.

The content decrypter 145 can receive conditional access (CA) encrypted content from the radio frequency (RF) Tuner/Demodulator Receiver 103 or Unified Memory 108. The CA encrypted content coming from unified memory may have been buffered from the Internet Protocol (IP) Receiver 101. The content decrypter 145 can also receive copy protected content. The copy protected content can come from the CableCARD or Common Interface module 111 or enhanced SIM module 117, which handles both key management and content decryption. The incoming copy protected content may also be temporarily buffered via unified memory 108 from the USB2 module 112. The copy protection application in the receiver typically uses the open key register 143.

For content stream based on MPEG2 transport, the receiver is able to determine the CA system ID (CAS_ID) required to decrypt a program when tuning a particular stream. The receiver is able to demultiplex system information (SI) and program specific information (PSI) using section filters 109. The CAS_ID can be extracted from one of the PSI tables—the Program Map Table (PMT). For web content, often a specific application is used from which the CAS_ID is just known. For example, if the Netflix web service is being accessed, then the CAS_ID is Microsoft Windows Media digital rights management (DRM). The television receiver can compare this CAS_ID with a list of CAS_IDs from various installed conditional access modules, smart cards, embedded cryptographic processors and standalone software. If the necessary module, smart card, or SIM is not installed in the appropriate slot, the user is informed of the fact, otherwise, from here, the content stream can be processed in any of several ways as will be described in the following descriptions.

It is noted that the specific functions of the various functional blocks shown in connection with FIG. 1 is provided in many instances in the descriptions accompanying FIGS. 2-4.

Module Processing

Referring now to FIG. 2, one simplified version of this mode of operation is shown in system 200 of FIG. 2a. The headend system 204 encrypts content under the CA system 208 to produce an encrypted content stream that arrives (in demodulated form) at the PCMCIA form factor CableCARD or digital video broadcasting (DVB) Common Interface module 111 where it is conditional access (CA) decrypted, and re-encrypted for copy protection across the CableCARD interface or Common Interface (not shown), and then copy-protection decrypted in the content decrypter 145 and then passed to the decoder 146, if consumed locally. In this scenario, the CableCARD or Common Interface module 111 performs both CA key management and stream decryption.

Figure 2B:
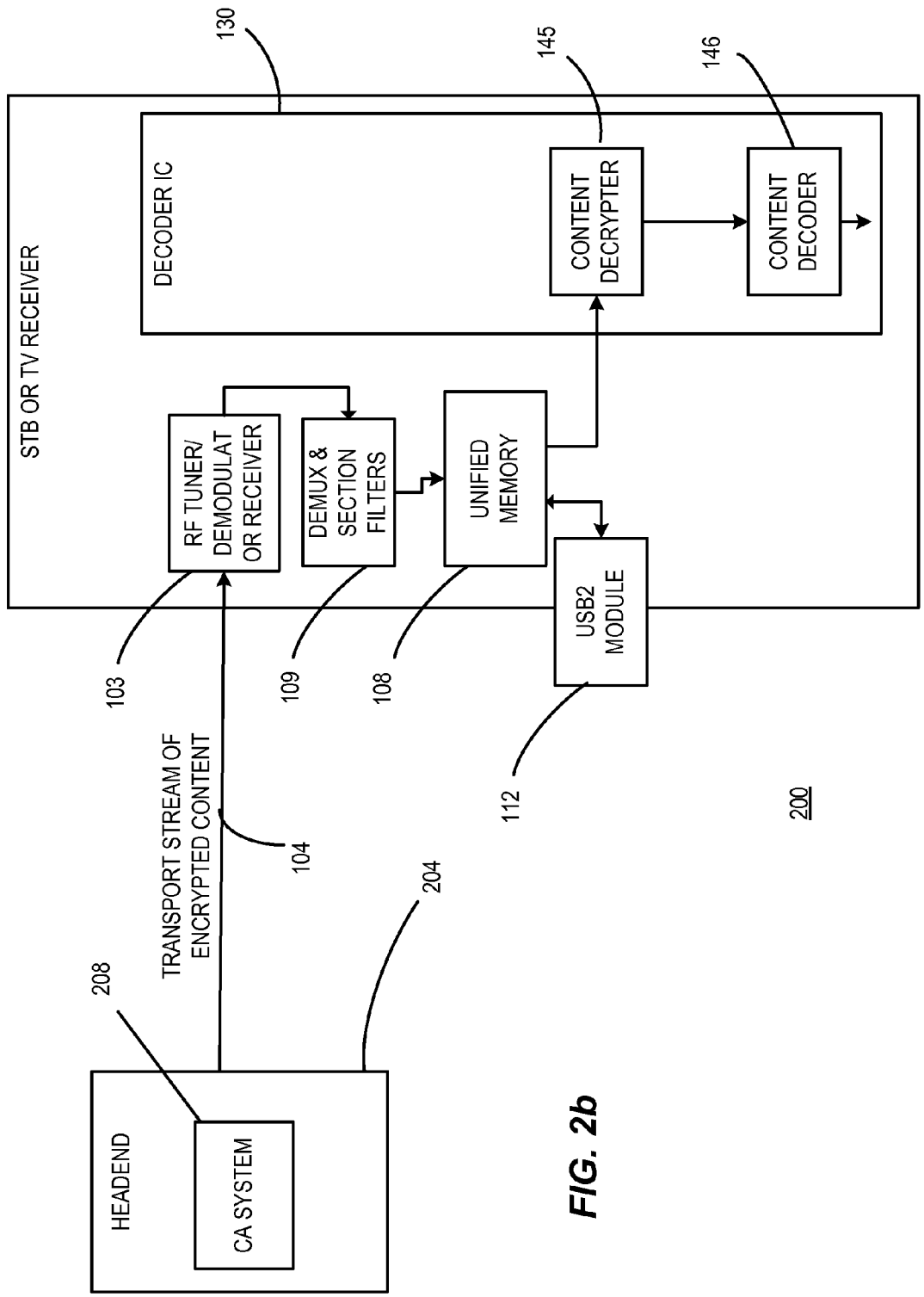

Another simplified version of this mode of operation is shown in system 200 of FIG. 2b. The system headend 204 encrypts content under the CA system 208 to produce an encrypted content stream that is temporarily buffered in memory 108 before arriving the USB2 module 112 where it is conditional access (CA) decrypted, and re-encrypted for copy protection across the USB2 interface (not shown), and after temporarily being buffered in memory 108, then sent and copy-protection decrypted in the content decrypter 145 and then passed to the decoder 146. In this scenario, the USB2 module 112 performs both CA key management and stream decryption.

Figure 2C:
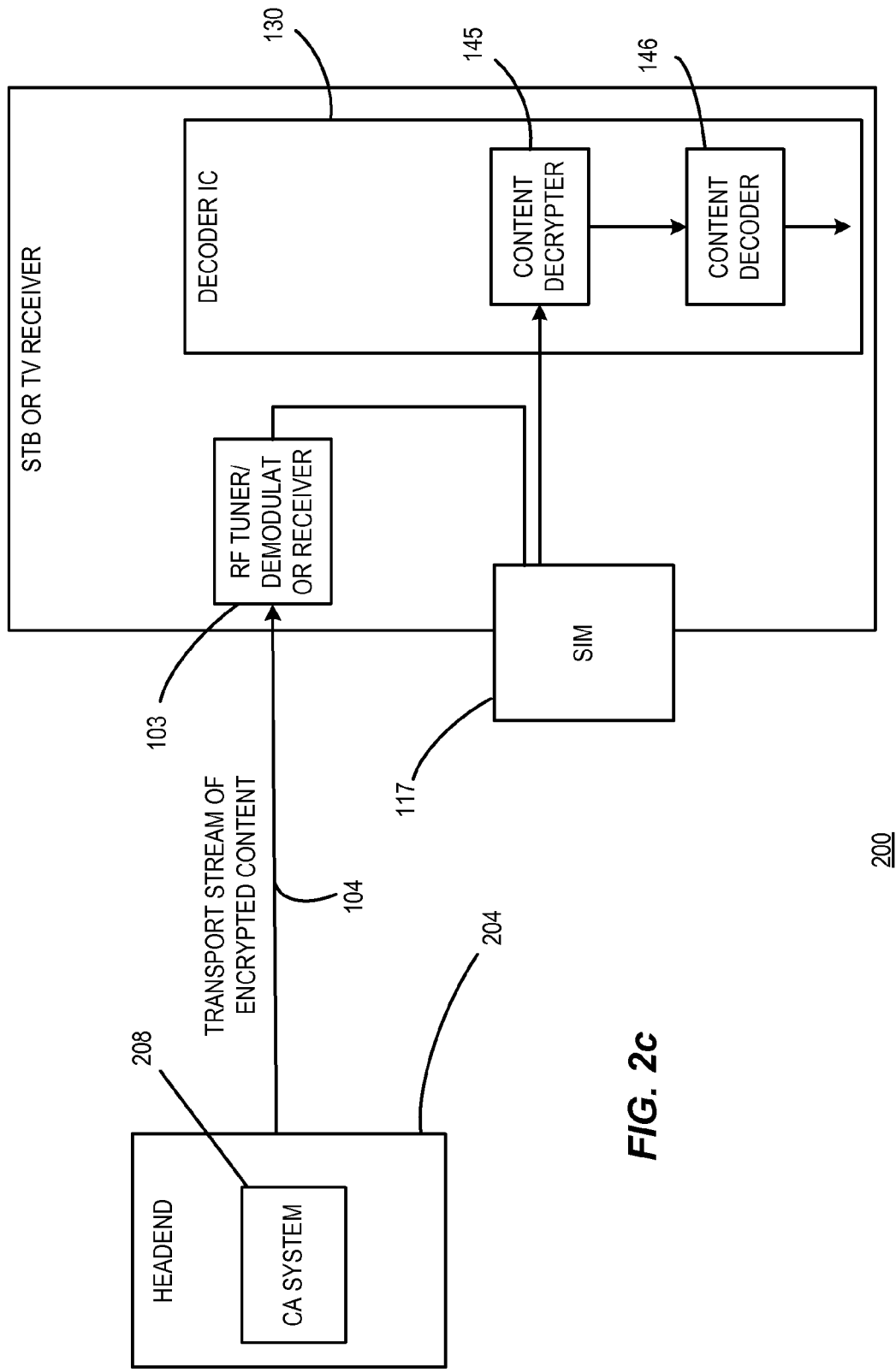

Another simplified version of this mode of operation is shown in system 200 of FIG. 2c. The system headend 204 encrypts content under the CA system 208 to produce an encrypted content stream that arrives at the enhanced SIM module 117 where it is conditional access (CA) decrypted, and re-encrypted for copy protection across the SIM interface (not shown), and then sent and copy-protection decrypted in the content decrypter 145 and then passed to the decoder 146. The SIM is very similar to a small smart card that is typically used in cell phone. Like a smart card, it may communicate using standard ISO7816 protocols (for example) with the UART 152 (not shown in this Figure). The small form factor and power requirement of the SIM makes it very desirable for small, low-cost digital receivers. The physical interface has been enhanced to accommodate the input and output of a serial transport stream and is referred to as the "enhanced SIM". The SIM module 117 performs both CA key management and stream decryption. However, it is possible to use the SIM 117 in a mode similar to a smart card 119 without the stream descrambling and just doing the key management.

Software Processing

FIG. 3, depicts a system 300 showing system 100 in simplified form to show the present key ladder processing corresponding to certain scenarios of Table 1 above. The software executed by the main processor 107 may communicate with the headend 304 and receives the encrypted content key and writes it to the Key Ladder data register 151 (not shown in FIG. 3). It is noted that in certain implementations, a fixed key ladder does not have to be used, but instead a programmable decryption method can reside in decrypter 145. This concept is described in U.S. Pat. No. 7,742,599.

Figure 3A:
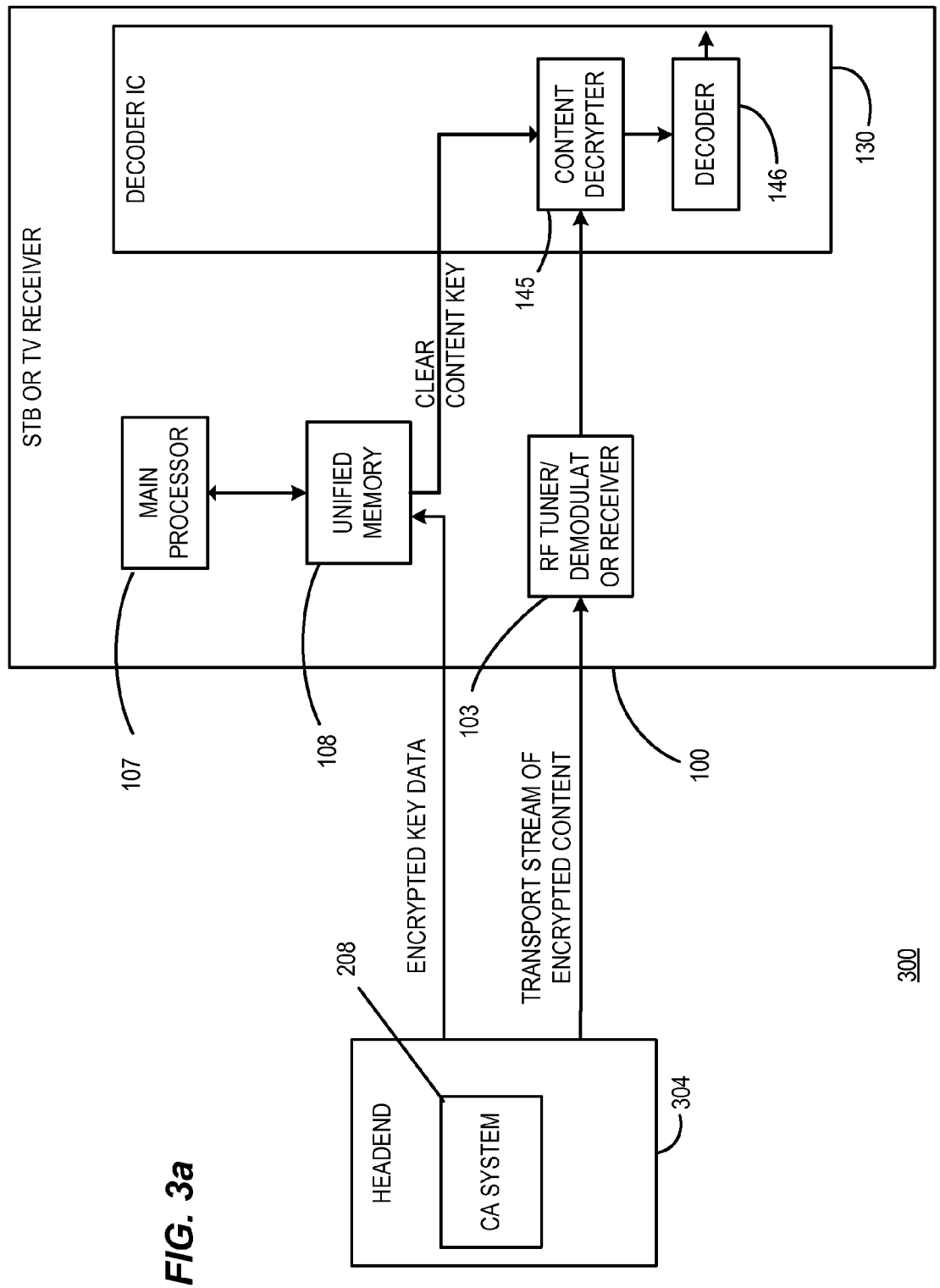
FIGS. 3*a*, 3*b*, 3*c*, and 3*d* (collectively "FIG. 3") are example block diagrams of a content delivery system and television receiver device consistent with certain embodiments of the present invention dealing with software.

Referring to FIG. 3 starting with FIG. 3a, in this mode of operation, no hardware module or separate cryptographic processor is used at all. Instead, a software conditional access application, corresponding to CA system 208 of headend 304, executes using the main processor 107 out of unified memory 108 and to process encrypted key data and write a clear key to the content decrypter 145 to decrypt the content. In this scenario, the encrypted content travels from the tuner/demodulator 103 or the Internet Protocol (IP) receiver (not shown) and switched to the content decrypter 145 for decryption.

Figure 3B:
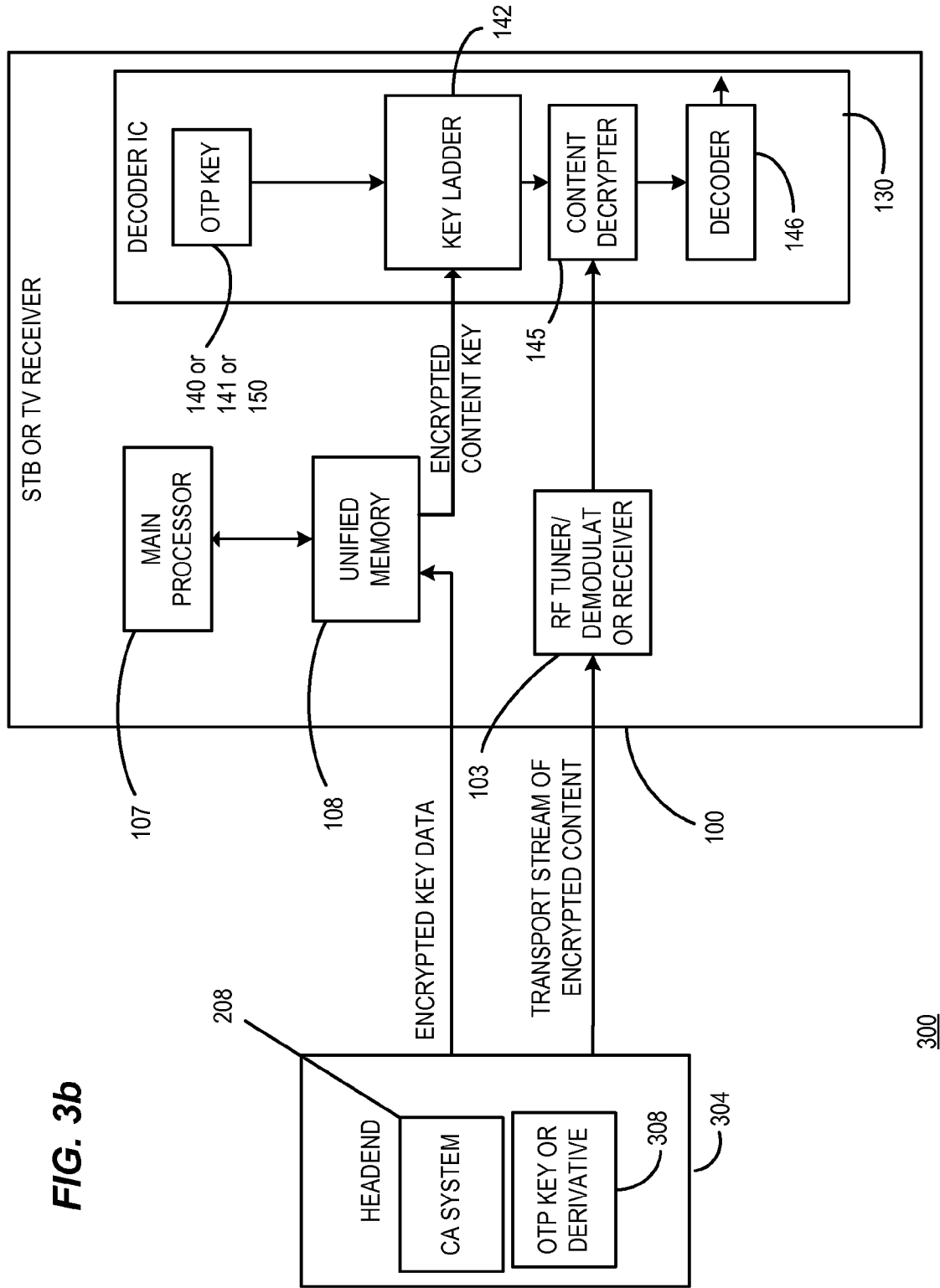

Referring to FIG. 3b, in this mode of operation, the software conditional access application is tied in to a one-time-programmable (OTP) key and key ladder that is part of the decoder system-on-chip (SoC). This information is known at 308 or a derivative thereof is known and used by CA system 208. It should be noted that there could be multiple OTP keys. An OTP key may be controlled and associated only with a particular CA system. Only the CA system vendor may know what the actual particular OTP key value that was burned into a particular decoder SoC. There could be multiple software conditional access application in operation in the digital receiver each accessing a different OTP key. As in the previous case, the software application executes using the main processor 107 out of unified memory 108 and to process encrypted key data and write an encrypted key to the key ladder register (not shown). In this scenario, the encrypted content travels from the tuner/demodulator 104 or the IP receiver through switch 106 (not shown) to the content decrypter 145 for decryption.

As in the previous case, the software downloaded may be a Java applet which might allow for a conditional application to run in different receivers. There are many ways that encrypted content keys can be delivered to a receiver in this scenario. The software can do a lot of the key management processing with the final stage handled by the key ladder 142. In this scenario, the decoder IC 130 incorporates a one-time programmable (OTP) key 140, 141 or 150 that is burned or otherwise programmed permanently into the decoder at the time of manufacture or initial programming. This OTP key can then be used in conjunction with a key ladder 142. The key ladder 142 may be manipulated by the downloaded conditional application executing in the main processor. The main processor may write external key data via the data register 151 to derive a key or set of keys for use by the content decrypter 145. Key ladders and associated technology are described in U.S. Pat. Nos. 7,742,599, 7,508,942, 7,336,302, 7,302,058 and 7,565,546, and U.S. published patent applications number 2008/0219443 and 2009/0168996, each of which is hereby incorporated by reference herein.

FIGS. 3a and 3b, depict a system 300 showing system 100 in simplified form to show the present key ladder processing corresponding to certain scenarios of Table 1 above. The software executed by the main processor 107 may communicate with the headend and receives the encrypted content key and writes it to the Key Ladder data register 151 (not shown in FIG. 3). It is noted that in certain implementations, a fixed key ladder does not have to be used, but instead a programmable decryption method can reside in decrypter 145. This concept is described in U.S. Pat. No. 7,742,599 which is hereby incorporated by reference.

In system 300, a headend 304 sends encrypted content and encrypted content keys or key information based on the OTP key or a derivative thereof 308 to the TV receiver device 100. A software conditional access application uses the content key information to manipulate the key ladder 142 in conjunction with the OTP key 140 to generate keys for the decrypter 145 for use in decrypting the encrypted content in the content stream. This decrypted content is then decoded at 146. As was noted earlier, the OTP key is stored in the decoder IC 130.

Figure 3C:
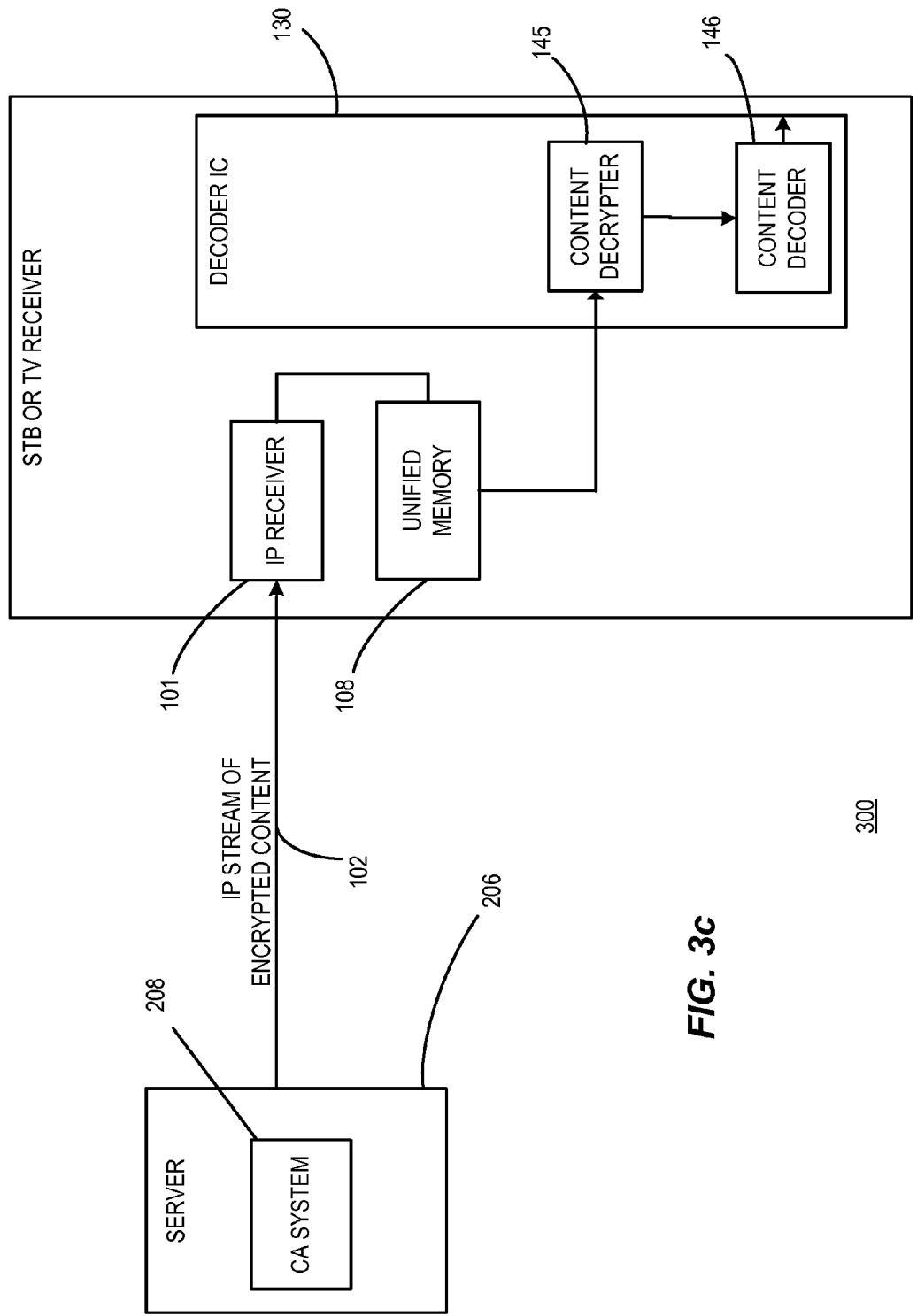

Another simplified version of this mode of operation is shown in system 300 of FIG. 3c. The system server 206 encrypts content under the CA system 208 to produce an encrypted IP content stream 102 that arrives at a DRM application running on a processor of IP receiver 101 executing out of unified memory 108 where the content is conditional access (CA) decrypted in the content decrypter 145 and then passed to the decoder 146. In this scenario, the DRM application performs CA key management.

Figure 3D:
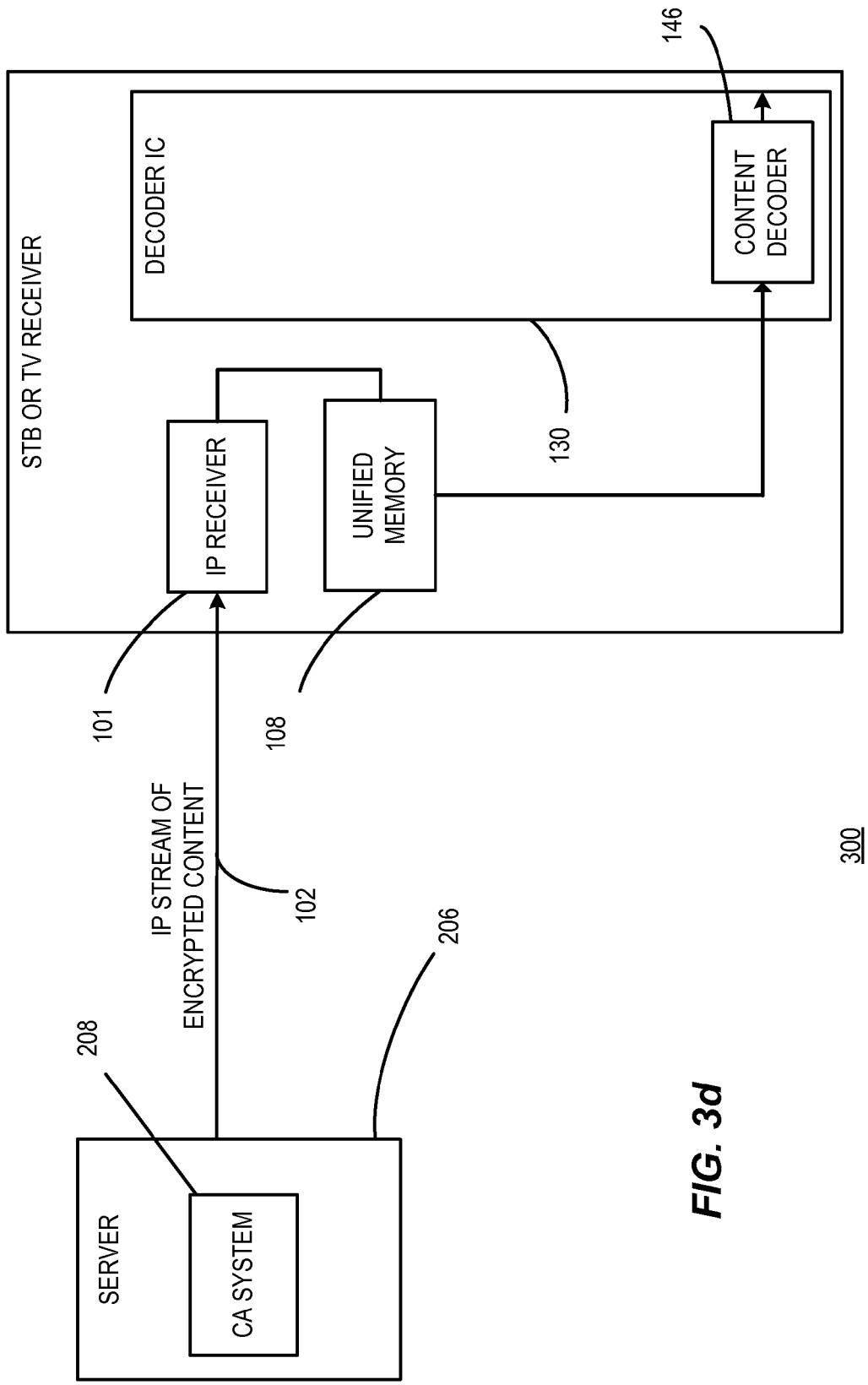

Another simplified version of this mode of operation is shown in system 200 of FIG. 3d. The system headend content server 206 encrypts content under the CA system 208 to produce an encrypted content stream 102 that arrives at a DRM application running on a processor of IP receiver 101 executing out of unified memory 108 where the content is conditional access (CA) decrypted in software by the same DRM application and then passed to the decoder 146. In this scenario, the DRM application performs CA key management and stream decryption.

Smart Card

The device 100 of FIG. 1 can also be configured by software control to utilize both the key ladder 142 and OTP key 140 together with a smart card 119 to affect an even more secure system 400 providing the advantages of both of the above systems configurations.

Figure 4A:
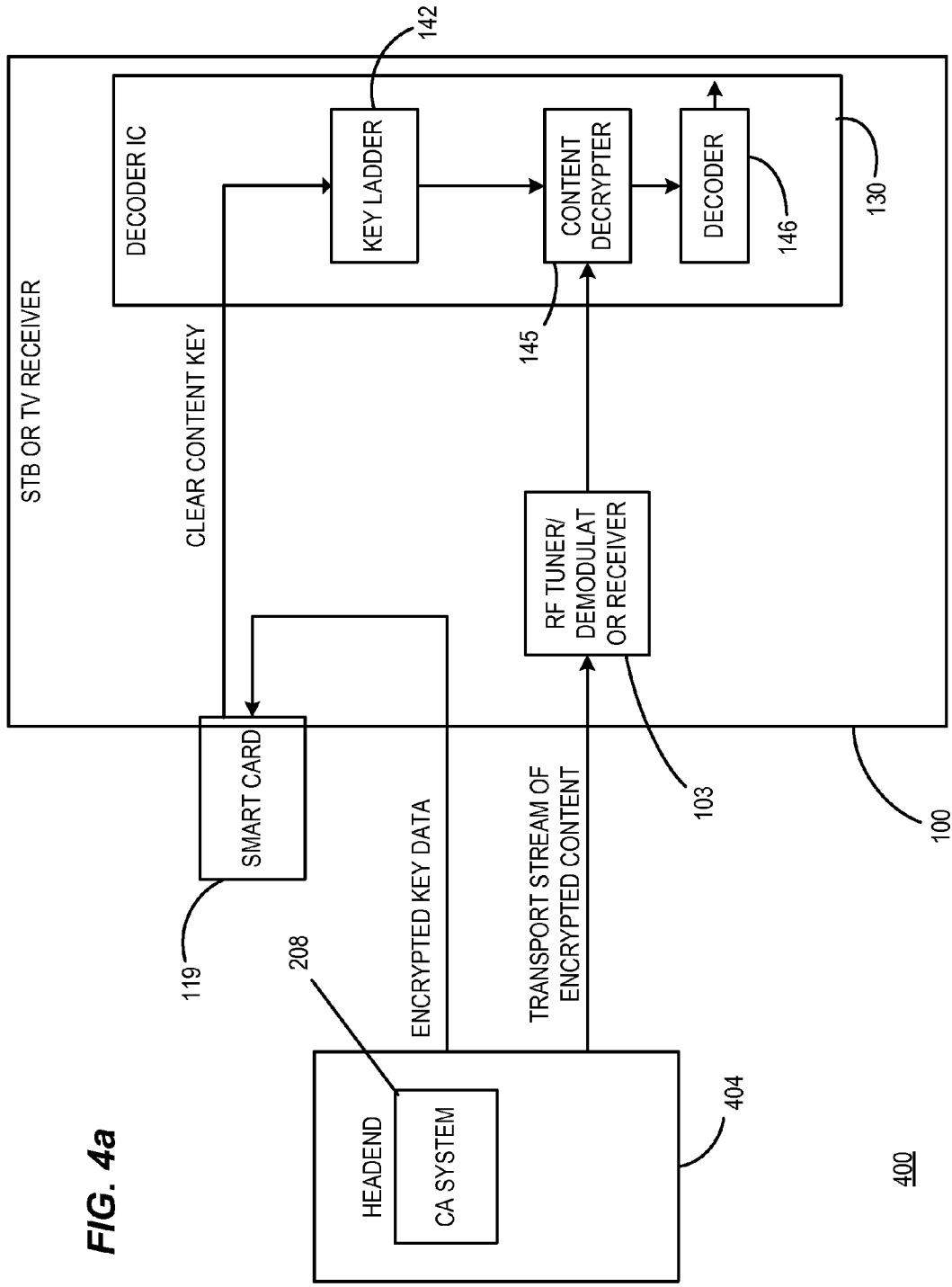
FIGS. 4*a* and 4*b* (collectively "FIG. 4") are example block diagrams of a content delivery system and television receiver device consistent with certain embodiments of the present invention dealing with smart cards.

Referring to FIG. 4 starting with FIG. 4a this figure depicts a simplified diagram of one implementation of this mode of operation with encrypted content key data arriving from headend 404 (after demodulating) at the smart card 119. As shown, the smart card then passes the content key after decryption to the key ladder 142. The content can then be decrypted by the decrypter at 145 and passed to the decoder 146.

Figure 4B:
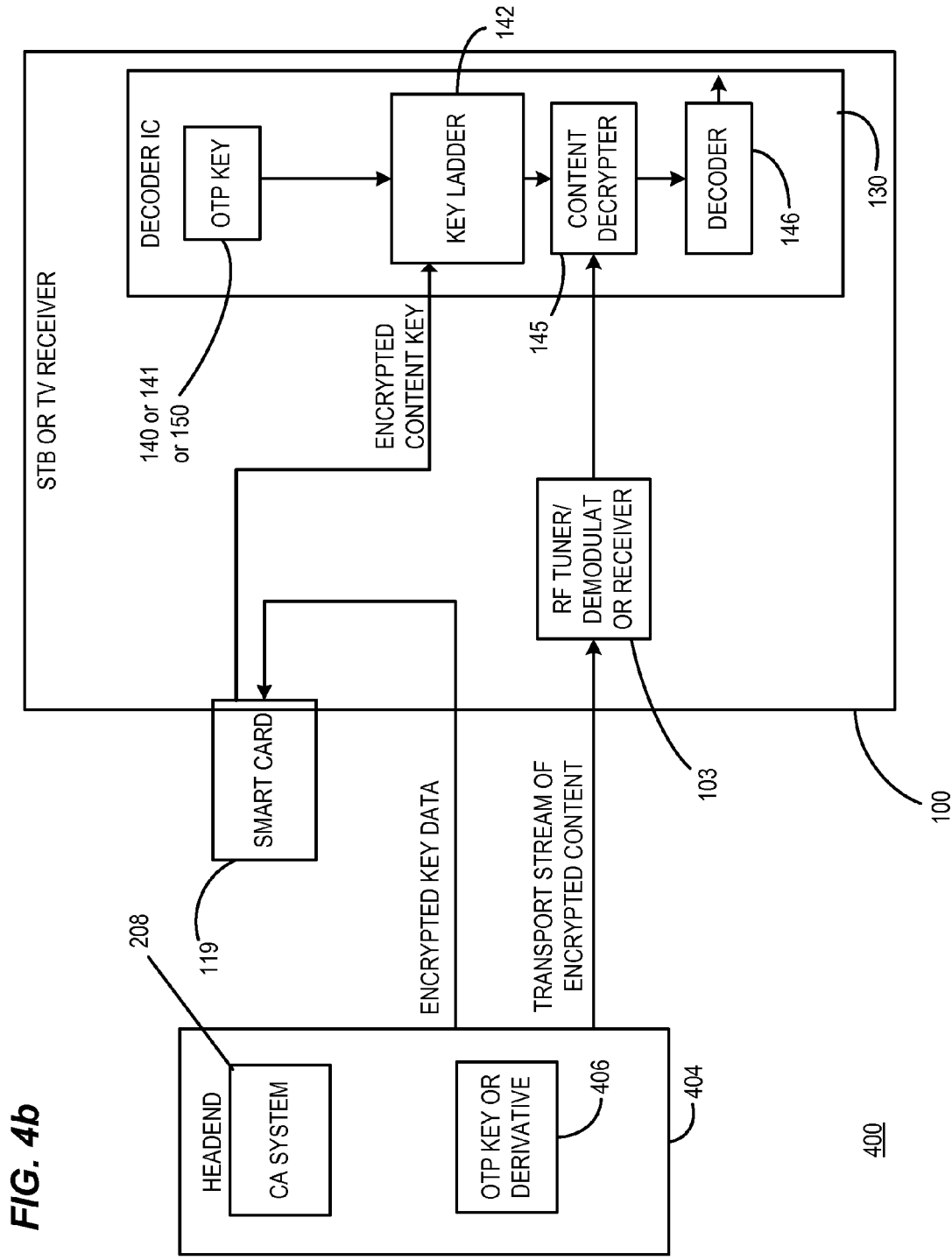

FIG. 4b depicts a simplified diagram of one implementation of this mode of operation with encrypted content key data, that uses either a OTP key or derivative thereof 406, arriving from headend 404 (after demodulating) at the smart card 119. As shown, the smart card then passes the content key after decryption to the key ladder 142. The content can then be decrypted by the decrypter at 145 and passed to the decoder 146. In this configuration, a smart card 119 carries information that can be used to modify the content key or operation of the key ladder 142 so as to render the CA system dependent on both the OTP key 140 (or 141 or 150) and the presence of a valid smart card 119 to operate. In this scenario, any number of alterations in the operation of the key ladder 142 can be implemented by use of the smart card 119.

A first example is that the content key can be double encrypted with one decryption operation taking place using the smart card 119 to carry out a first stage of decryption. The content is then passed to the decrypter 145 for a second stage of decryption using the key ladder 142 and OTP key.

In a second example, the smart card 119 can serve as a repository for keys or seeds for keys that are used in conjunction with the OTP key 140 (or 141 or 150) to derive a valid key from external key data supplied by the headend. The possibilities for use of the smart card 119 in conjunction with the key ladder 142 are endless and can be modified at will by either exchanging or reprogramming the smart card 119 so as to keep content pirates at bay. Many other variations are possible without departing for implementations consistent with the present invention including use of multiple OTP keys alone or in combination with other keys to carry out the encryption/decryption process.

Figure 5:
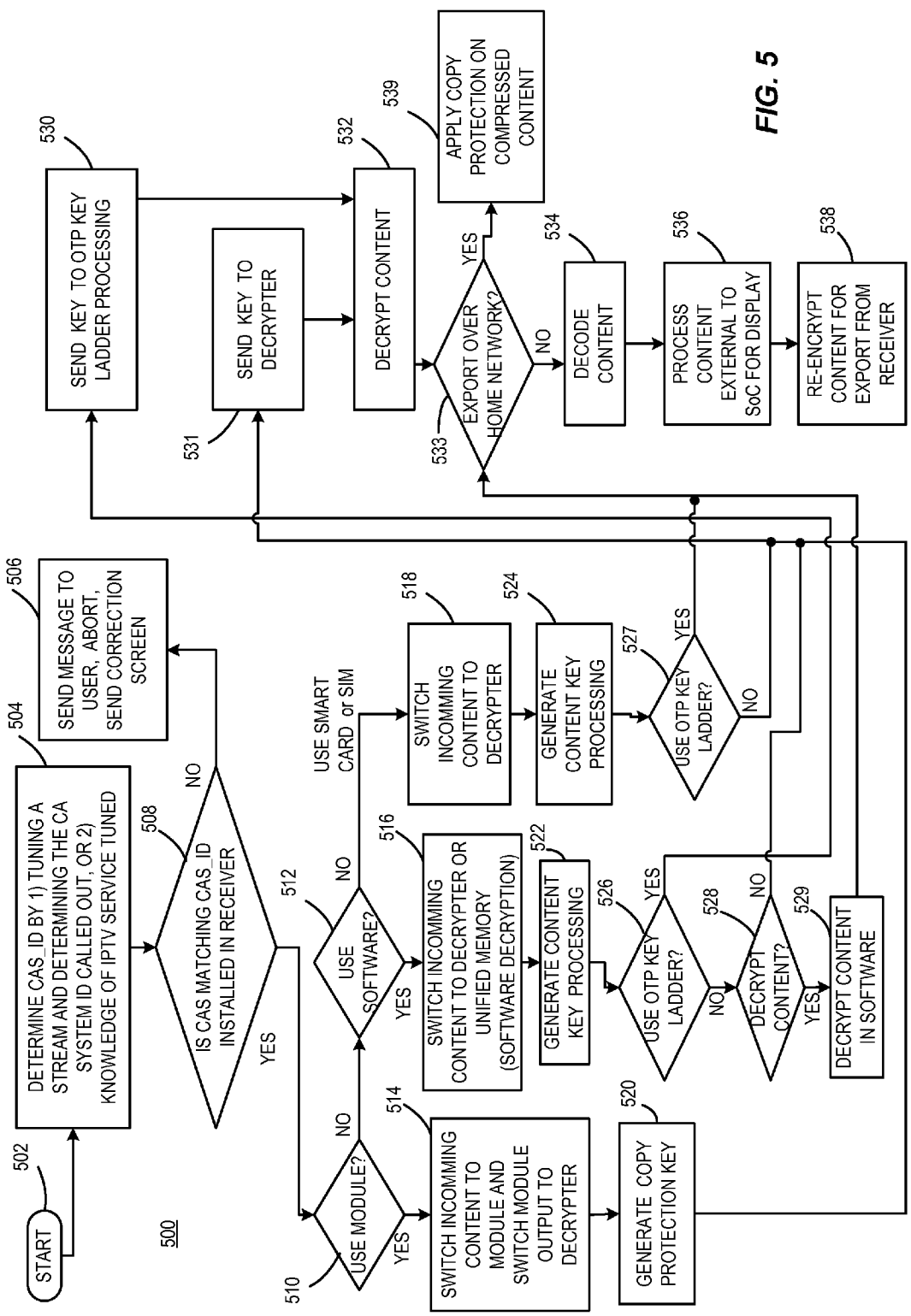
FIG. 5 is an example flow chart of a process consistent with certain embodiments of the present invention.

Referring now to FIG. 5, a example flow chart of operation of one implementation of a television receiver device consistent with certain implementation is depicted in which process 500 starts at 502 after which the receiver device 100 determines the CA system ID (CAS_ID) required to decrypt a content stream either by attempting to parse the PSI of the stream or by know the web application used to access a service 504. If there are no matching CAS_ID 508, then the process is aborted 506. The user is informed of the problem, and a screen that allows the user to correct the problem may get displayed.

The receiver, 100, can examine installed CA systems to see which one can be used, e.g. a module that does key management and stream descrambling, e.g. CableCARD, Common Interface module, enhanced SIM, USB2 module, or one that just does key management, smart card, the smart card with OTP-key ladder, SIM, SIM with OTP-key ladder, standalone software, or software with OTP-key ladder at 510 or 512.

If the module matches a module at 510, e.g. CableCARD, the content will be switched to the module for CA decryption, and the input to the decrypter will be switched to the output of the module 514. The receiver generates a copy protection key 520 which is used with the open key register of the decrypter. A key is sent to the decrypter at 531 and the content is decrypted at 532. The clear compressed content may be delivered out on the home network at 533. It is first copy protected 539, e.g. with digital transmission copy protection for Internet protocol (DTCP/IP or DTCP-IP). Locally consumed content will be decompressed 534 and processed for digital visual interface (DVI) or high definition multimedia interface (HDMI) 536, and copy protected encrypted if needed at 538 for safe transport to an external display or internal display interface or other output.

If the CA System ID received from the stream match an installed software CA application at 512, then the content is switched at 516 to either the content decrypter or unified memory depending on whether the CA application will decrypt the content. In both cases, the application generates the content key used to decrypt the content 522. If the content is to be used with content decrypter, then it might also use the key ladder at 526. If it does, then the key is written to the key ladder register for processing 530. If not, then control passes through 528 and the key is written into the clear key register at 531. Else, if the content is to be decrypted by the software at 528, then the content is decrypted in unified memory at 529 and then it is decided whether the compressed content is needed for distribution on the home network at 533 or it is to be consumed locally. The content is processed similar to the module from here on.

If the CA System ID received from the stream match an installed CA system, e.g. smart card or non-enhanced SIM at 512, then the encrypted content is switched to the decrypter 518. In this case, keys are generated within the card 108 at 524. A determination is made to either write the key to the clear key register of the decrypter or key ladder register depending on whether the key ladder is used 527. Depending upon the decision at 527, control passes to either 533 or 531. The processing is similar to the software scenario discussed above for here on.

Many variations in operation consistent with the present embodiment can be devised—in particular when a combination of smart card 119 and key ladder 142 with a OTP key 140, 141 or 150 is considered. Any desired number of such OTP keys can be provided within SoC 130, hence the example use of three is not intended to be limiting. These functions can be combined in numerous ways to keep hackers and pirates from unauthorized use of content and cloning of receiver devices.

Thus, a digital television receiver device supporting two or more different conditional access systems has a content receiver that obtains an encrypted content stream and a processor. A content stream decrypter decrypts an encrypted content stream for conditional access or copy protection from at least one of the following interfaces: an interface to a CableCARD, an interface to a Common Interface Module consumer replaceable module for use with conditional access key management and content stream conditional access decryption and content stream copy protection re-encryption, and at least one of the following interfaces: an interface to a USB2 compatible consumer replaceable module, an interface to an enhanced SIM consumer replaceable card. Other variations are disclosed as described herein.

Several example implementations can be devised as follows using the various architectures and processes as described above, but other examples will occur to those skilled in the art upon consideration of the present teachings.

EXAMPLES

Example 1

A digital television receiver device supporting two or more different conditional access systems. In this implementation example a content receiver that obtains an encrypted content stream and utilizes a processor and a content stream decrypter that decrypts an encrypted content stream for conditional access or copy protection. At least two of the following interfaces are provided: an interface to a smart card for use with conditional access key management that uses a clear key register with the content stream decrypter, an interface to a SIM for use with conditional access key management that uses a clear key register with the content stream decrypter, an interface to an embedded cryptographic processor for use with conditional access key management that uses a clear key register with the content stream decrypter, an interface to a standalone software conditional access application for use with conditional access key management that uses a clear key register with the content stream decrypter, an interface to a standalone software conditional access application for use with conditional access key management and stream decryption and where the stream decrypter used for conditional access decryption or copy protection is not used, an interface to a smart card for use with conditional access key management that uses an encrypted key register working in conjunction with a one-time programming key and an internal key ladder resulting in a clear key used by the content stream decrypter, an interface to an embedded cryptographic processor for use with conditional access key management that uses an encrypted key register working with a one-time programming key and an internal key ladder resulting in a clear key used by the content stream decrypter, an interface to an software conditional access application for use with conditional access key management that uses an encrypted key register working with a one-time programming key and an internal key ladder resulting in a clear key used by the content stream decrypter, and an interface to a consumer replaceable module for use with conditional access key management and content stream conditional access decryption and content stream copy protection re-encryption.

In variations of this example, the interface to a consumer replaceable module comprises of one of a PCMCIA module, USB2 compatible module, enhanced SIM module that handles key management and stream CA decryption and copy-protection re-encryption, CableCARD, and Common Interface module.

Example 2

A digital television receiver device supporting two or more different conditional access systems. In this example, a content receiver obtains an encrypted content stream. A processor and a content stream decrypter decrypts an encrypted content stream for conditional access or copy protection. At least one of the following interfaces is provided: an interface to a smart card for use with conditional access key management that uses an encrypted key register working in conjunction with a first one-time programming key and an internal key ladder resulting in a clear key used by the content stream decrypter, an interface to a SIM for use with conditional access key management that uses an encrypted key register working in conjunction with a first one-time programming key and an internal key ladder resulting in a clear key used by the content stream decrypter, an interface to an embedded cryptographic processor for use with conditional access key management that uses an encrypted key register working with a first one-time programming key and an internal key ladder resulting in a clear key used by the content stream decrypter, an interface to an software conditional access application for use with conditional access key management that uses an encrypted key register working with a first one-time programming key and an internal key ladder resulting in a clear key used by the content stream decrypter.

Additionally, at least one of the following interfaces is also provided: an interface to a smart card for use with conditional access key management that uses an encrypted key register working in conjunction with a second one-time programming key and an internal key ladder resulting in a clear key used by the content stream decrypter, an interface to a SIM for use with conditional access key management that uses an encrypted key register working in conjunction with a second one-time programming key and an internal key ladder resulting in a clear key used by the content stream decrypter, an interface to an embedded cryptographic processor for use with conditional access key management that uses an encrypted key register working with a second one-time programming key and an internal key ladder resulting in a clear key used by the content stream decrypter, an interface to an software conditional access application for use with conditional access key management that uses an encrypted key register working with a second one-time programming key and an internal key ladder resulting in a clear key used by the content stream decrypter.

Example 3

A digital television receiver device supporting two or more different conditional access systems. In this example, a content receiver obtains an encrypted content stream. A processor and a content stream decrypter decrypts an encrypted content stream for conditional access or copy protection. At least one of the following interfaces is provided: an interface to a CableCARD consumer replaceable module for use with conditional access key management and content stream conditional access decryption and content stream copy protection re-encryption, and an interface to a Common Interface Module consumer replaceable module for use with conditional access key management and content stream conditional access decryption and content stream copy protection re-encryption. Additionally, at least one of the following interfaces is provided: an interface to a USB2 compatible consumer replaceable module for use with conditional access key management and content stream conditional access decryption and content stream copy protection re-encryption; and an interface to an enhanced SIM consumer replaceable card for use with conditional access key management and content stream conditional access decryption and content stream copy protection re-encryption.

Example 4

A digital television receiver device supporting two or more different conditional access systems. A processor and a content stream decrypter decrypts an encrypted content stream for conditional access or copy protection. At least two of the following interfaces: an interface to a PCMCIA form factor consumer replaceable module for use with conditional access key management and content stream conditional access decryption and content stream copy protection re-encryption; an interface to a USB2 compatible consumer replaceable module for use with conditional access key management and content stream conditional access decryption and content stream copy protection re-encryption; an interface to an enhanced SIM consumer replaceable card for use with conditional access key management and content stream conditional access decryption and content stream copy protection re-encryption.

Example 5

A digital television receiver device supporting three or more different conditional access systems. A content receiver obtains an encrypted content stream. A processor and a content stream decrypter decrypts an encrypted content stream for conditional access or copy protection. At least three of the following interfaces are provided: an interface to a CableCARD consumer replaceable module for use with conditional access key management and content stream conditional access decryption and content stream copy protection re-encryption; an interface to a Common Interface Module consumer replaceable module for use with conditional access key management and content stream conditional access decryption and content stream copy protection re-encryption; an interface to a USB2 consumer replaceable module for use with conditional access key management and content stream conditional access decryption and content stream copy protection re-encryption; an interface to an enhanced SIM consumer replaceable card for use with conditional access key management and content stream conditional access decryption and content stream copy protection re-encryption; an interface to a smart card for use with conditional access key management that uses a clear key register with the content stream decrypter; an interface to a SIM card for use with conditional access key management that uses a clear key register with the content stream decrypter; an interface to an embedded cryptographic processor for use with conditional access key management that uses a clear key register with the content stream decrypter; an interface to a standalone software conditional access application for use with conditional access key management that uses a clear key register with the content stream decrypter; an interface to a standalone software conditional access application for use with conditional access key management and stream decryption and where the stream decrypter used for conditional access decryption or copy protection is not used; an interface to a smart card for use with conditional access key management that uses an encrypted key register working in conjunction with a one-time programming key and an internal key ladder resulting in a clear key used by the content stream decrypter; an interface to an embedded cryptographic processor for use with conditional access key management that uses an encrypted key register working with a one-time programming key and an internal key ladder resulting in a clear key used by the content stream decrypter; an interface to an software conditional access application for use with conditional access key management that uses an encrypted key register working with a one-time programming key and an internal key ladder resulting in a clear key used by the content stream decrypter.

Example 6

A digital television receiver device supporting three or more different conditional access systems. A content receiver obtains an encrypted content stream. A processor and a content stream decrypter decrypts an encrypted content stream for conditional access or copy protection. At least one of the following interfaces is provided: an interface to a smart card for use with conditional access key management that uses an encrypted key register working in conjunction with a first one-time programming key and an internal key ladder resulting in a clear key used by the content stream decrypter, an interface to a SIM for use with conditional access key management that uses an encrypted key register working in conjunction with a first one-time programming key and an internal key ladder resulting in a clear key used by the content stream decrypter; an interface to an embedded cryptographic processor for use with conditional access key management that uses an encrypted key register working with a first one-time programming key and an internal key ladder resulting in a clear key used by the content stream decrypter, an interface to an software conditional access application for use with conditional access key management that uses an encrypted key register working with a first one-time programming key and an internal key ladder resulting in a clear key used by the content stream decrypter. Additionally, at least one of the following interfaces is provided: an interface to a smart card for use with conditional access key management that uses an encrypted key register working in conjunction with a second one-time programming key and an internal key ladder resulting in a clear key used by the content stream decrypter; an interface to a SIM for use with conditional access key management that uses an encrypted key register working in conjunction with a second one-time programming key and an internal key ladder resulting in a clear key used by the content stream decrypter; an interface to an embedded cryptographic processor for use with conditional access key management that uses an encrypted key register working with a second one-time programming key and an internal key ladder resulting in a clear key used by the content stream decrypter; and an interface to an software conditional access application for use with conditional access key management that uses an encrypted key register working with a second one-time programming key and an internal key ladder resulting in a clear key used by the content stream decrypter.

Additionally, at least one of the following interfaces is provided: an interface to a smart card for use with conditional access key management that uses an encrypted key register working in conjunction with a third one-time programming key and an internal key ladder resulting in a clear key used by the content stream decrypter; an interface to a SIM for use with conditional access key management that uses an encrypted key register working in conjunction with a third one-time programming key and an internal key ladder resulting in a clear key used by the content stream decrypter; an interface to an embedded cryptographic processor for use with conditional access key management that uses an encrypted key register working with a third one-time programming key and an internal key ladder resulting in a clear key used by the content stream decrypter; an interface to an software conditional access application for use with conditional access key management that uses an encrypted key register working with a third one-time programming key and an internal key ladder resulting in a clear key used by the content stream decrypter.

As can be gleaned from the above examples, many combinations of interfaces can be utilized in combination in a manner consistent with examples of embodiments of the present invention. Those skilled in the art will appreciate that other variants are also possible.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments. It will further be appreciated upon consideration of the present teachings that the connections to the main processor are indicative of signal flow as opposed to actual interconnections which may be implemented with one or more buses or with dedicated connections.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Also, while certain embodiments herein were described in conjunction with specific circuitry that carries out the functions described, other embodiments are contemplated in which the circuit functions are carried out using equivalent executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A device comprising:
   at least one receiver;
   at least one processor communicatively coupled to the receiver;
   at least one decrypter controllable by the at least one processor to decrypt an encrypted content stream from the receiver; and
   at least two of:
   a first physical hardware interface to a first smart card configured with instructions to facilitate conditional access key management using a clear key register with the content stream decrypter,
   a second physical hardware interface to a SIM configured with instructions to facilitate conditional access key management using a clear key register with the content stream decrypter,
   a third physical hardware interface to a second smart card configured with instructions to facilitate conditional access key management using an encrypted key register working in conjunction with a one-time programming key and an internal key ladder resulting in a clear key used by the content stream decrypter,
   a fourth physical hardware interface to a consumer replaceable module configured with instructions to facilitate with conditional access key management and content stream conditional access decryption and content stream copy protection re-encryption.

2. The device of claim 1, where the fourth interface is to a consumer replaceable module comprising one of a PCMCIA module, USB2 compatible module, enhanced SIM module that handles key management and stream CA decryption and copy-protection re-encryption, CableCARD, and Common Interface module.

3. A device comprising:
   a content receiver that obtains an encrypted content stream;
   a processor;
   a content stream decrypter that decrypts an encrypted content stream for conditional access or copy protection;
   at least one of the following first set of physical hardware interfaces:
   a physical hardware interface to a smart card configured with instructions for using an encrypted key register working in conjunction with a first one-time programming key and an internal key ladder resulting in a clear key used by the content stream decrypter,
   a physical interface to a SIM configured with instructions for using an encrypted key register working in conjunction with a first one-time programming key and an internal key ladder resulting in a clear key used by the content stream decrypter,
   and
   at least one of the following second set of physical hardware interfaces:
   a physical hardware interface to a smart card configured with instructions for using an encrypted key register working in conjunction with a second one-time programming key and an internal key ladder resulting in a clear key used by the content stream decrypter,
   a physical hardware interface to a SIM configured with instructions for using an encrypted key register working in conjunction with a second one-time programming key and an internal key ladder resulting in a clear key used by the content stream decrypter,
   a physical hardware interface to an embedded cryptographic processor configured with instructions for using an encrypted key register working with a second one-time programming key and an internal key ladder resulting in a clear key used by the content stream decrypter.

4. A device comprising:
   at least one of the following first set of interfaces:
   a physical hardware interface to a CableCARD consumer replaceable module configured with instructions executable by at least one processor to implement conditional access key management and content stream conditional access decryption and content stream copy protection re-encryption,
   a physical hardware interface to a Common Interface Module consumer replaceable module configured with instructions executable by at least one processor to implement conditional access key management and content stream conditional access decryption and content stream copy protection re-encryption,
   and
   at least one of the following second set of physical hardware interfaces:
   a physical hardware interface to a USB2 compatible consumer replaceable module configured with instructions executable by at least one processor to implement conditional access key management and content stream conditional access decryption and content stream copy protection re-encryption,
   a physical hardware interface to an enhanced SIM consumer replaceable card configured with instructions executable by at least one processor to implement conditional access key management and content stream conditional access decryption and content stream copy protection re-encryption.

5. A device comprising:
   at least two of the following physical hardware interfaces:
   a physical hardware interface to a PCMCIA form factor consumer replaceable module configured with instructions executable by at least one processor to implement conditional access key management and content stream conditional access decryption and content stream copy protection re-encryption, a physical hardware interface to a USB2 compatible consumer replaceable module configured with instructions executable by at least one processor to implement conditional access key management and content stream conditional access decryption and content stream copy protection re-encryption, and a physical hardware interface to an enhanced SIM consumer replaceable card configured with instructions executable by at least one processor to implement conditional access key management and content stream conditional access decryption and content stream copy protection re-encryption.

6. A device comprising:

at least three of the following physical hardware interfaces:

a physical hardware interface to a CableCARD consumer replaceable module configured with instructions executable by at least one processor to implement conditional access key management and content stream conditional access decryption and content stream copy protection re-encryption, a physical hardware interface to a Common Interface Module consumer replaceable module configured with instructions executable by at least one processor to implement conditional access key management and content stream conditional access decryption and content stream copy protection re-encryption, a physical hardware interface to a USB2 consumer replaceable module configured with instructions executable by at least one processor to implement conditional access key management and content stream conditional access decryption and content stream copy protection re-encryption, a physical hardware interface to an enhanced SIM consumer replaceable card configured with instructions executable by at least one processor to implement conditional access key management and content stream conditional access decryption and content stream copy protection re-encryption, a physical hardware interface to a smart card configured with instructions executable by at least one processor to implement conditional access key management that uses a clear key register with the content stream decrypter, a physical hardware interface to a SIM card configured with instructions executable by at least one processor to implement conditional access key management that uses a clear key register with the content stream decrypter, and a physical hardware interface to a smart card configured with instructions executable by at least one processor to implement conditional access key management that uses an encrypted key register working in conjunction with a one-time programming key and an internal key ladder resulting in a clear key used by the content stream decrypter.

7. A device comprising:

at least one of the following first set of interfaces:

a physical hardware interface to a smart card configured with instructions executable by at least one processor to implement conditional access key management that uses an encrypted key register working in conjunction with a first one-time programming key and an internal key ladder resulting in a clear key used by the content stream decrypter, a physical hardware interface to a SIM configured with instructions executable by at least one processor to implement conditional access key management that uses an encrypted key register working in conjunction with a first one-time programming key and an internal key ladder resulting in a clear key used by the content stream decrypter, and at least one of the following second set of physical hardware interfaces:

a physical hardware interface to a smart card configured with instructions executable by at least one processor to implement conditional access key management that uses an encrypted key register working in conjunction with a second one-time programming key and an internal key ladder resulting in a clear key used by the content stream decrypter, a physical hardware interface to a SIM configured with instructions executable by at least one processor to implement conditional access key management that uses an encrypted key register working in conjunction with a second one-time programming key and an internal key ladder resulting in a clear key used by the content stream decrypter; and at least one of the following third set of physical hardware interfaces:

a physical hardware interface to a smart card configured with instructions executable by at least one processor to implement conditional access key management that uses an encrypted key register working in conjunction with a third one-time programming key and an internal key ladder resulting in a clear key used by the content stream decrypter, a physical hardware interface to a SIM configured with instructions executable by at least one processor to implement conditional access key management that uses an encrypted key register working in conjunction with a third one-time programming key and an internal key ladder resulting in a clear key used by the content stream decrypter.

* * * * *